(12) United States Patent
Wang et al.

(10) Patent No.: US 11,935,137 B2
(45) Date of Patent: Mar. 19, 2024

(54) METHOD FOR DISTRIBUTING EQUITY REWARD FOR FEDERATED LEARNING BASED ON EQUITY THEORY

(71) Applicant: BEIJING JIAOTONG UNIVERSITY, Beijing (CN)

(72) Inventors: Wei Wang, Beijing (CN); Guorong Chen, Beijing (CN); Pengrui Liu, Beijing (CN); Xiaoting Lyu, Beijing (CN); Xiangrui Xu, Beijing (CN); Chao Li, Beijing (CN); Li Duan, Beijing (CN); Dawei Zhang, Beijing (CN); Jiqiang Liu, Beijing (CN); Yi Jin, Beijing (CN); Yidong Li, Beijing (CN)

(73) Assignee: BEIJING JIAOTONG UNIVERSITY, Beijing (CN)

( * ) Notice: Subject to any disclaimer, the term of this patent is extended or adjusted under 35 U.S.C. 154(b) by 0 days.

(21) Appl. No.: 18/357,213

(22) Filed: Jul. 24, 2023

(65) Prior Publication Data
US 2024/0046372 A1 Feb. 8, 2024

(51) Int. Cl.
G06Q 40/12 (2023.01)
G06N 3/098 (2023.01)
G06Q 40/04 (2012.01)

(52) U.S. Cl.
CPC ........... *G06Q 40/125* (2013.12); *G06N 3/098* (2023.01)

(58) Field of Classification Search
CPC .............................. G06Q 40/125; G06N 3/098
USPC .......................................................... 705/30
See application file for complete search history.

(56) References Cited

U.S. PATENT DOCUMENTS

| 2023/0029345 A1* | 1/2023 | Deschenaux | .......... G06Q 40/04 |
| 2023/0195428 A1* | 6/2023 | Deng | ..................... G06N 3/096 717/110 |

\* cited by examiner

*Primary Examiner* — Garcia Ade
(74) *Attorney, Agent, or Firm* — CBM PATENT CONSULTING, LLC (57) ABSTRACT

A method for distributing an equity reward for federated learning based on an equity theory includes the following steps: applying Adams' equity theory to federated learning, analyzing, by a participant, all factors invested in a federated task comprehensively, then giving an expected reward for this task, calculating, by the task publisher, the reputation of the participant; participating, by the participant, in each round of a training task using a local data to evaluate data contribution, model contribution, and a waiting-time allowance of the participant, then combining contribution results of the three factors to evaluate the contribution of the participant; after a global model converges, dynamically adjusting weights of the three factors according to an objective function of the equity reward, with a goal that an actual reward of the participant is as close as possible to the expected reward, and obtaining and distributing the actual reward of the participant.

3 Claims, 2 Drawing Sheets

METHOD FOR DISTRIBUTING EQUITY REWARD FOR FEDERATED LEARNING BASED ON EQUITY THEORY

CROSS-REFERENCE TO RELATED APPLICATIONS

This application claims priority to Chinese Patent Application Ser. No. CN2022109374565 filed on 5 Aug. 2022.

TECHNICAL FIELD

The present invention relates to the technical field of federated learning, and in particular, to a method for distributing an equity reward for federated learning based on an equity theory.

TECHNICAL BACKGROUND

Federated Learning (FL), as a machine learning method, implements collaborative training of a global model across a plurality of data owners (participants) while keeping training data local. Federated learning is an important solution for data security and privacy protection and attracts widespread attention in academia and industry. Most traditional machine learning methods rely heavily on data volume for training, and federated learning has a tendency to do the same. Therefore, attracting a large number of participants to a federated learning task is an important guarantee for obtaining a quality model. However, considering only the number of participants is insufficient because federated learning suffers from data heterogeneity (e.g., non-Independent and Identically Distributed data), resource heterogeneity (e.g., computational resources), and the diversity of a device of a participant, which ranges from a server with sufficient computing power to a resource-constrained wearable. A resource-constrained device also is an important source of data for the federated learning task. Therefore, an effective incentive mechanism needs to be designed to compensate training costs of the participant and promote active participation in training by heterogeneous participants.

Ensuring that the incentive mechanism is equitable is critical to attracting a high-quality participant and creating a sustainable federated learning ecosystem. It is worth noting that equity does not mean equality. If one incentive mechanism distributes equal rewards to each participant while ignoring differences in data, resources, etc. of the participant, the incentive mechanism creates inequity, which not only encourages a free-riding attack, but also discourages some high-quality participants from taking part in the federated learning task because of the unfair treatment that the high-quality participants receive. For this reason, many equity-perceived incentive mechanisms have been proposed. In essence, these methods first evaluate the contribution of the participants to a global model and then assign a corresponding reward based on the value of the contribution.

These equity-perceived incentive mechanisms implicitly assume one condition that all participants are satisfied with the method of distributing a reward based on a contribution rate. However, this is clearly inconsistent with social psychology research and so is not held in many practical scenarios. Therefore, it is meaningful and important to design a method for distributing an equity reward for federated learning based on the equity theory and provide participant-perceived equity to increase motivation for participating in federated learning.

Currently, a method for targeting reward equity in the prior art mainly distributes the rewards to the participants of the federated learning based on a fixed contribution-reward ratio, which is categorized into the following four types:

A method for distribution based on data contribution: establishing data quality evaluation indicators, such as the data volume, data distribution, data type, etc., and prioritizing the distribution of more rewards to the high-quality participant based on an evaluation result, while a low-quality participant receives fewer rewards, so as to achieve the objective of attracting the high-quality participant.

A method for distribution based on model contribution: establishing an evaluation index for the participant for updating a model, such as model accuracy, model score, etc. According to a contribution evaluation result, aggregation models with different performances are distributed to the participants as rewards, so that the participants with different model contributions obtain aggregated models with different performances.

A method for distribution based on a utility game: the utility game is widespread in a labor market and a competitive environment, and the effectiveness of the utility game depends on the distribution of the reward. The method distributes the reward equitably based on the utility of the participant. The three commonly used distribution methods are equal reward distribution, marginal gain, and marginal loss.

A method for distribution based on reputation mechanism: using reputation as a non-monetary incentive method to realize the reward for the participants. Each participant maintains one reputation score. The contribution of the participant is evaluated by evaluating the data that the participant submits, to enable the method for distributing the reward that matches the contribution with the reputation.

Disadvantages of a method for reward equity in the prior art described above include: a method for evaluation based on the contribution distributes the reward to achieve the equity based on a contribution rate. These solutions assume that all the participants recognize the equity based on a contribution-reward rate. However, this assumption is unreasonable and incomplete, as the evaluated contribution hardly encompasses all aspects of inputs to a federated learning task by the participant. According to the equity theory proposed by Adams, it can be seen that equity is one relative concept. The evaluation and perception of equity treatment of an individual rely on an input-benefit ratio. The benefit is the reward received. The input contains not only the contribution evaluated, but also many other factors such as enthusiasm, experience, and tolerance. Therefore, it is difficult to achieve equity that meets the psychological needs of the participant by relying only on contribution evaluation.

SUMMARY

An embodiment of the present invention provides a method for distributing an equity reward for federated learning based on an equity theory to achieve reward equity of a federated learning task.

To realize the foregoing objective, the present invention adopts the following technical solutions.

A method for distributing an equity reward for federated learning based on an equity theory includes the following steps:

applying Adams' equity theory to federated learning to realize the equity of reward distribution; in a preparation phase, obtaining the reputation and an expected reward of the participant; in a training process, participating, by the participant, in each round of a training task using local data, evaluating data contribution, model contribution, and waiting-time allowance of the participant at the same time, and obtaining the results of the contribution of the three factors; an entering a reward distribution phase after a global model converges, dynamically adjusting weights of the three factors according to an objective function of the equity reward, with a goal that an actual reward of the participants is as close as possible to the expected reward, obtaining and distributing the actual reward of the participants; and uploading the data of the forgoing processes to a blockchain. In the present invention, the actual situation of the different participants is taken into account. The actual rewards are distributed with the goal of meeting the expectations of all the participants as much as possible, to realize the equity of meeting the expectations of the participants.

Preferably, the step of applying Adams' equity theory to federated learning to achieve equity in reward distribution includes:

suggesting, by Adams' equity theory, that the perceived equity of an individual is not only concerned with whether an individual (l) has the same input (I)-benefit (O) ratio as others (o), but also concerned with whether the individual has the same input (I)-benefit (O) ratio in the present (c) as that in the past (h). The benefit is the reward received, while the input is the various factors that an individual contributes to in the accomplishment of a task, including the level of education, effort, time, and tolerance, etc., which can vary from individual to individual in evaluating input factors. Adams' equity theory can be expressed in the following formula:

$$\frac{O_l}{I_l} = \frac{O_o}{I_o} \quad (1)$$

$$\frac{O_c}{I_c} = \frac{O_h}{I_h} \quad (2)$$

This method applies Adams's equity theory to federated learning. The federated learning publicizes the results of the reward of the participant on a blockchain, so that the benefit (O) can be accurately obtained by all the participants. However, federated learning keeps the training data local to the participant. There is no direct communication between the participants. Therefore, it is difficult to obtain the inputs (I) of the participant, such as data, computing power, time, and motivation. To this end, when this method transforms the inputs and benefits of the equity theory into the Expected Reward E (ER) and the Actual Reward A (AR), then there is the following:

$$\forall i, A_i = O_i, E_i = f_i(I_i) \quad (3)$$

$$\forall i, j, \frac{A_i}{E_i} = \frac{A_j}{E_j} \quad (4)$$

$$\forall i, j, \frac{A_i^c}{E_i^c} = \frac{A_i^h}{E_i^h} \quad (5)$$

where i and j denote different participants. If the participant i transforms the benefits into the AR $A_i$ and the inputs $I_i$ into the ER $E_i$ using a personalized input evaluation function $f_i$, formulas (1) and (2) can be transformed into formulas (4) and (5). The formula (4) satisfies that the individual has the same ER (E)-AR (A) ratio as the others. The formula (5) satisfies that the individual has the same ER (E)-AR (A) ratio in the current (c) as that in the past (h). This method proposes expectation equity to satisfy both formulas (4) and (5), simplifying the goal of the expectation equity to:

$$\forall_i, A_i = E_i \quad (6)$$

From formula (6), it can be seen that this method satisfies the equity theory by making the AR and the ER of all the participants as close as possible to each other, thus realizing the equity expected by the participants, which also avoids the problem of individual bias that may exist in the equity theory when the individual perceives the inputs of others.

Preferably, the step of obtaining the reputation and the expected reward of the participant in the preparation phase includes:

considering, by each participant, different factors based on individual cognitive differences when proposing the ER, such as local data quality, device resources, experience, and motivation, which can cover some or all of the factors relevant to the federated learning task. After comprehensively analyzing all the factors invested in the federated task, the participant i gives the expected reward ER for this task, i.e. $E_i$.

The participant, in inexperience or in bad faith, may propose an ER that does not meet realistic expectations. For this reason, a reputation mechanism is introduced to deal with the problem. The task publisher uses a historical task to calculate the reputation of the participant, which is used to evaluate the credibility of the ER given by the participant. Combining the historical federated learning task of each participant, the degree of match between the ER and the AR for each task is evaluated. The higher the match, the better the result. A forgetting factor is utilized as a coefficient. The closer to the current moment, the higher the weight of the task. Therefore, the reputation value of the participant is obtained.

The task publisher obtains the reputation $V_i$ of the participant i based on the historical reputation record of the participant, which is calculated by the following formula:

$$V_i = \sum_{t=t_0}^{t_{now}} \left(1 - \frac{2}{\pi} \cdot \tan^{-1}\left(\frac{A_i^t - E_i^t}{A_i^t}\right)\right) \cdot e^{-(t-t_{now})} \quad (7)$$

wherein $A_i^t$ and $E_i^t$ are the actual reward AR and the expected reward ER of the participant i in a t-th task, and $e^{-(t-t_{now})}$ is a forgetting factor of the t-th task.

Preferably, the steps of participating, by the participant, in each round of the training task using the local data, and evaluating the three factors of the data contribution, the model contribution, and the waiting-time allowance of the participant, to obtain the contribution results of the three factors include: in the training process, participating, by the participant, in each round of the training task according to training rules of federated learning, for example, in an r-th round, downloading an aggregated global model of the r−1-th round from a blockchain, training the aggregated global model using the local data, uploading an updated local model to the blockchain, and repeating this training process, after the global model of the r-th round is aggregated, until the model converges.

The contribution of the participant needs to be evaluated while the model is trained. However, it is difficult to accurately obtain the contribution of the participant in a single dimension. First, in federated learning, the training data of the participants are kept local and are difficult to be directly obtained and accurately evaluated. Therefore, a single evaluation method that relies only on the data dimensions is not reasonable. Second, evaluating the local model submitted by the participant can obtain the contribution of a model dimension. However, with non-IID data distribution, it is not possible to select a suitable test dataset for an accurate evaluation of the local model. Third, it is difficult for the evaluation of the data and the model dimension to measure device resources that the participant contributes to the training task, such as memory, a CPU and network bandwidth. Finally, the motivation of the participant is also crucial for federated learning because even if the participant has sufficient device resources, negative training and delayed uploading of the local model by the participant can seriously prolong the training time and burden the whole task. It is worth noting that the metrics of the device resources and the motivation can be determined by time dimension. Because the better device resources and motivation require only a small amount of training time during the training and uploading of the local model, which indicates spending more waiting time. Therefore, the use of subsidizing waiting time takes into account the time cost to the participant and increases the motivation to train.

Through the forgoing analyses, it is clear that a method for evaluating a multi-dimensional (data, models and time) contribution can more reasonably and accurately obtain the contribution of the participant, and can avoid the problem of incomplete evaluation caused by a single factor. Therefore, the present invention uses the data contribution, the model contribution, and the waiting-time allowance as the three factors to comprehensively evaluate the contribution of the participant.

Participant i calculates the data contribution $u_{1i}$ according to a formula $$u_{1i} = \frac{D_i}{D} + (1-d_i).$$

$D_i$ is the data volume for the participant i. D is the data volume for all the participants. $d_i$ is EMD (Earth Mover's Distance) of a similarity measure between participant i and overall data distribution;

Model evaluations are rated by the participants against each other. in each round of the training, the participant determines an accuracy rate of the local model submitted by another participant with the local data to give an evaluation score. An average score of the model is a model score of the round. The model evaluation score of the participant i in the r-th round is $$u_{2i}^r = \frac{1}{N-1} \sum_{j \in N, j \neq i} S_{ji}^r,$$

where, $S_{ji}^r$ is the score of the participant i by the participant j in the r-th round.

The waiting time of the participant can be obtained using the local model uploading time recorded by the blockchain. The waiting time allowance of participant i in the r-th round is $$u_{3i}^r = \frac{T_* - T_i^r}{T_*},$$

where, when $T_*$ is a waiting-time threshold, the waiting time within the threshold obtains the reward.

Preferably, the steps of entering the reward distribution phase after the global model converges and, dynamically adjusting the weights of the three factors according to the objective function of the equity reward, with the goal that the actual reward of the participant is as close as possible to the expected reward, and obtaining and distributing the actual reward of the participant include:

aggregating, by the task publisher, the local model of each participant and determining whether the global model converges according to set decision conditions, if the global model does not converge, each participant downloads the current global model and continues the forgoing training process; if it is determined that the global model converges, the reward distribution phase is entered. The task publisher calculates the total value $u_{2i} = \Sigma_r u_{2i}^r$ of the model evaluation and the total value $u_{3i} = \Sigma_r u_{3i}^r$ of the waiting-time allowance of participant i. Then, the three factors of the data contribution, the model evaluation, and the waiting-time allowance of the participant i are evaluated as $U_i = [u_{1i}, u_{2i}, u_{3i}]^T$. Let the weights of the three factors of the data contribution, the model evaluation, and the waiting-time allowance be $\Gamma = [\gamma_1, \gamma_2, \gamma_3]$. According to the objective function of the equity reward distribution, the weights $\Gamma$ are calculated by using a trust domain linear constraint minimized method. The actual reward value $A_i = \Gamma \cdot U_i$ of the participant i can be obtained. Then, the actual reward value $A_i$ is distributed to the participant i. Where the objective function of the equity reward distribution is:

$$\min \sum_{i=1}^{N} V_i \cdot (\Gamma \cdot U_i - E_i) \tag{8}$$

Calculating the weights $\Gamma$ of the three factors with the goal of meeting the expectations of all participants as much as possible has the following advantages: 1) avoiding the problem of irrational weight design by adjusting the weights to achieve the objective of matching expectations as much as possible; 2) distributing the AR based on the three factors evaluated, and effectively counteracting the free-riding attack of the participant; and 3) avoiding the problem of a poor incentive brought about by distributing the AR based on the ER directly.

Preferably, the step of uploading the data of all of the processes to the blockchain includes:

uploading data from the federated learning process, including the reputation and the ER of the participant, the global model in each round, the updated local model of the participant, the three factors of the contribution and the AR, to the blockchain, utilizing tamper-resistant and traceable features of the blockchain so that the training and evaluation processes are verifiable, and ensuring that the evaluation of an equity reward mechanism is objective and effectively enforced.

As can be seen from the technical solutions provided by the foregoing embodiments of the present invention, in the present invention, the three factors, namely, the data contribution, the model evaluation, and the waiting-time allowance, are utilized to determine the actual contribution of the participant, and obtain the AR of the participant by dynamically distributing the weights of the three factors, to achieve the goal that the AR is as close as possible to the ER. The motivation of the participants during the training process is increased, while being able to effectively respond to the free-riding attack.

The present invention is suitable for Artificial Intelligence (AI)-related applications, including intelligent transportation, healthcare, edge computing, and robot systems, in particular, to a federated learning method. The method can be integrated as a circuit/software application for clients of federated learning, and enables enhancing clients' motivation through equity reward distribution to optimize training tasks and increase efficiency.

Additional aspects and advantages of the present invention will be given in part in the following description and will become apparent from the following description or through the practice of the present invention.

BRIEF DESCRIPTION OF THE DRAWINGS

In order to describe the technical solutions of embodiments in the present invention more clearly, the following briefly introduces the drawings that need to be used in the embodiments. Obviously, the drawings in the following description are only some of the embodiments of the present invention. A person skilled in art can obtain other drawings based on these drawings without creative labor.

DETAILED DESCRIPTION OF EMBODIMENTS

Embodiments of the present invention are described in detail below. Examples of the embodiments are shown in the accompanying drawings. The same or similar reference numbers throughout denote the same or similar elements or elements having the same or similar function. The embodiments described below by reference to the accompanying drawings are exemplary, are intended only for the objective of explaining the present invention and are not to be construed as a limitation of the present invention.

Those skilled in the art may understand that the singular forms "a," "an," "the" and "the" used herein may also include the plural forms unless specifically stated. It is further understood that the term "comprising" as used in the specification of the present invention refers to the presence of such features, integers, steps, operations, elements and/or assemblies, but does not preclude the presence or addition of one or more other features, integers, steps, operations, elements, components and/or groups thereof. It should be understood that when an element is "connected" or "coupled" to another element, the element may be directly connected or coupled to other elements, or an intermediate element can be provided. In addition, "connecting" or "coupling" as used herein may include wireless connection or coupling. The term "and/or" as used herein includes any unit and all combinations of one or more associated listings.

Those skilled in the art may understand that unless defined otherwise, all terms used herein, including technical and scientific terms, have the same meaning as commonly understood by the person skilled in the art to which the present invention belongs. It should also be understood that terms such as those defined in the general dictionary are to be understood as having a meaning consistent with that in the context of the prior art and are not to be interpreted in an idealized or overly formal sense unless defined in a manner as is the case here.

In order to facilitate the understanding of the embodiments of the present invention, the following will be combined with the accompanying drawings to take a plurality of specific embodiments by way of examples to make further explanations, and each embodiment does not constitute a limitation of the embodiments of the present invention.

The embodiment of the present invention extends contribution equity to input equity of a participant from the perspective of satisfying the participant's own needs and expectations, and realizes the equity that satisfies the participant.

An embodiment of the present invention designs a method for distributing an equity reward for federated learning based on an equity theory, in a manner that meets the individual expectation of the participant for the objective of realizing the same input-to-benefit ratio for all participants, thereby realizing equity in the distribution of the reward in federated learning.

Figure 1:
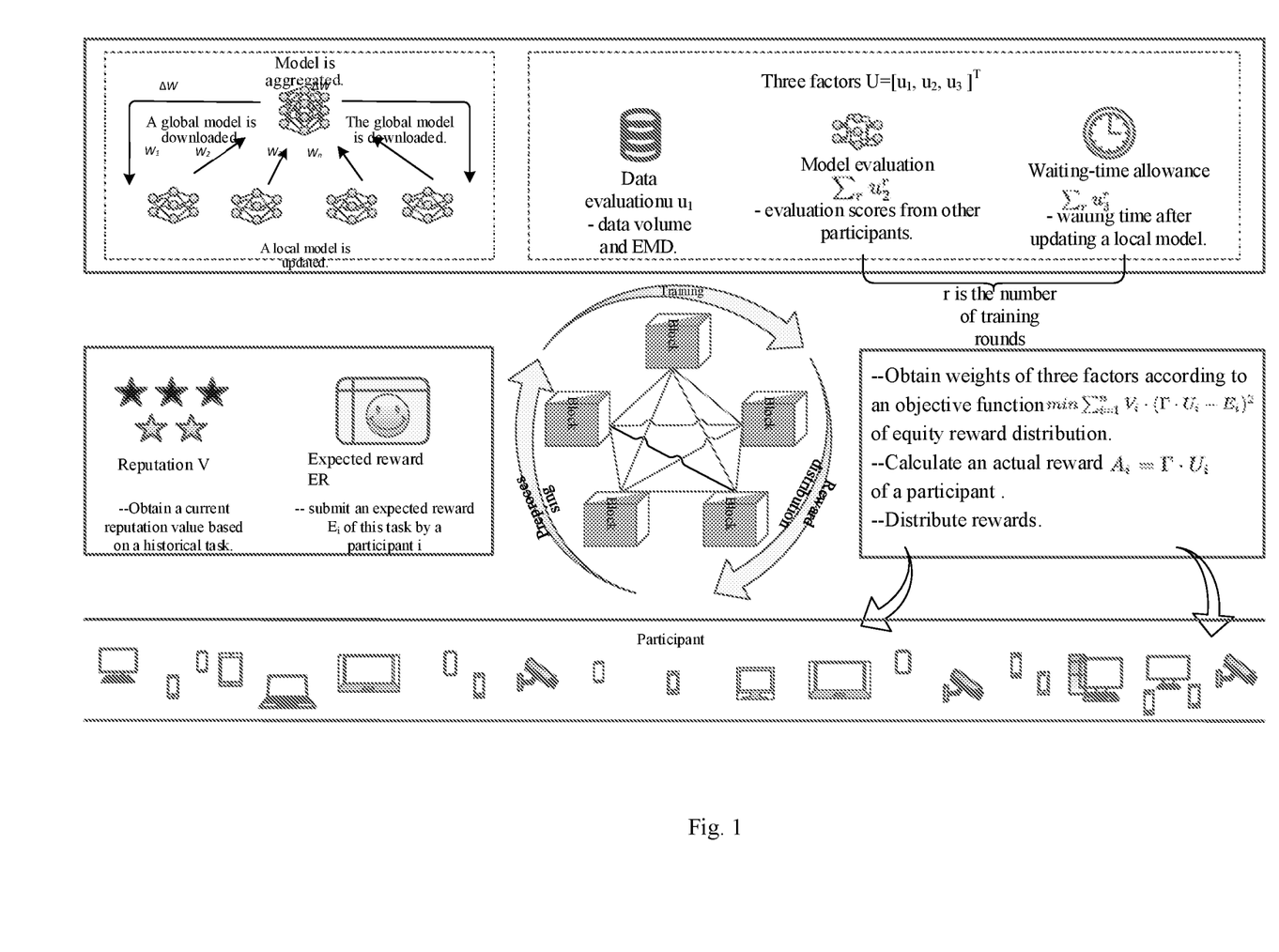
FIG. 1 is a schematic diagram of a method for distributing an equity reward for federated learning based on an equity theory provided by an embodiment of the present invention.

A schematic diagram of a method for distributing equity reward for federated learning based on an equity theory provided by an embodiment of the present invention is shown in FIG. 1 and includes the following processing processes:

applying Adams' equity theory to federated learning to achieve equity in reward distribution. suggesting, by Adams' equity theory, that the perceived equity of an individual is not only concerned with whether an individual (l) has the same input (I)-benefit (O) ratio as others (o), but also whether the individual has the same input (I)-benefit (O) ratio in the present (c) as that in the past (h). The benefit is the reward received, while the input is the various factors that an individual contributes to in the accomplishment of a task, including the level of education, effort, time, and tolerance, etc., which can vary from individual to individual in evaluating input factors. Adams' equity theory can be expressed in the following formula:

$$\frac{O_l}{I_l} = \frac{O_o}{I_o} \quad (1.)$$

$$\frac{O_c}{I_c} = \frac{O_h}{I_h} \quad (2.)$$

This method applies Adams's equity theory to federated learning. The federated learning publicizes the results of the reward of the participant on a blockchain, so that the benefit (O) can be accurately obtained by all participants. However, federated learning keeps the training data local to the participant. There is no direct communication between the participants. Therefore, it is difficult to obtain the inputs (I) of other participants, such as data, computing power, time, and motivation. To this end, in the present invention, each participant is required to give the expected reward (ER) for this task after considering all the factors of the inputs. The equity theory is satisfied by making the AR and ER of all the participants as close as possible to each other, thus realizing equity expected by the participants, which also avoids the problem of individual bias that may exist in the equity theory when the individual perceives the inputs of others.

In the present invention, the inputs and benefits of the equity theory are transformed into the Expected Rewards E (ER) and the Actual Rewards A (AR). Then, there is the following:

$$\forall i, A_i = O_i, E_i = f_i(I_i) \quad (3.)$$

$$\forall i, j, \frac{A_i}{E_i} = \frac{A_j}{E_j} \quad (4.)$$

$$\forall i, j, \frac{A_i^c}{E_i^c} = \frac{A_i^h}{E_i^h} \quad (5.)$$

where i and j denote different participants. If the participant i transform the benefits into AR $A_i$ and the inputs $I_i$ into ER $E_i$ using a personalized input evaluation function $f_i$, formulas (1) and (2) can be transformed into formulas (4) and (5). The formula (4) satisfies that the individual has the same ER (E)-AR (A) ratio as the others. The formula (5) satisfies that the individual has the same ER (E)-AR (A) ratio in the current (c) as that in the past (h). Therefore, in order to satisfy both formulas (4) and (5), the method proposes expectation equity and simplifies the goal of the expectation equity as follows:

$$\bullet_i A_i = E_i \quad (6.)$$

From formula (6), this method satisfies the equity theory by making the ARs and ERs of all the participants as close as possible to each other, thus realizing the equity expected by the participants, which also avoids the problem of individual bias that may exist in the equity theory when the individual perceives the inputs of others.

In the preparation (preprocessing) phase, a task publisher evaluates the reputation of the participant based on the historical task of the participant, while the participant submits the expected reward (ER) for the task. The training phase is divided into two aspects: model training and contribution evaluation. During each round of training on a model training side, the participant is required to submit updated model parameters. After a global model is aggregated, the participant downloads a global model of a current round and trains locally, repeating the process until the model converges. In terms of the contribution evaluation, the contribution of the participant needs to be evaluated based on three dimensions, including the data contribution, the model evaluation, and the waiting-time allowance. In a reward distribution phase, the reputation is used as the credibility weight of the participant. The weights of the three factors of data, a model, and waiting time for all participants are dynamically adjusted so that the Actual Reward (AR) obtained based on the three factors is as close as possible to the ER. Equity is achieved by meeting the expectation of the participant. Data from all of the forgoing processes need to be uploaded to the blockchain.

1) The step of applying Adams' equity theory to federated learning to achieve equity in the reward distribution includes:
    suggesting, by Adams' equity theory, that the perceived equity of an individual is not only concerned with whether an individual has the same input-benefit ratio as others, but also concerned whether the individual has the same input-benefit ratio in the present as that in the past. In a federated scenario, it is difficult to know exactly the values of each other's inputs, although the actual reward (AR) of the different participants can be obtained. To this end, each participant is required to give the expected reward (ER) for this task after considering all the factors of the inputs. The equity theory is satisfied by making the AR and ER of all the participants as close as possible to each other, thus realizing the equity expected by the participants, which also avoids the problem of the individual bias that may exist in the equity theory when the individual perceives the inputs of others.

2) The reputation described includes:
    The inexperienced or malicious participant may propose ER that does not meet realistic expectations. For this reason, a reputation mechanism is invoked to deal with the problem. The reputation of the participant is calculated using the historical task and used to evaluate the credibility of the participant in giving the ER. The task publisher combines the historical federated learning task of each participant to evaluate the degree of match between the ER and the AR for each task. A forgetting factor is utilized as a coefficient. The closer to a current moment, the higher the weight of the task. Therefore, the reputation value of the participant is obtained.

3) The expected reward (ER) as described includes:
    considering, by each participant, different factors based on individual cognitive differences when proposing ER, such as local data quality, device resources, experience, and motivation, which can cover some or all of the factors relevant to the federated learning task. After comprehensively analyzing all the factors invested in the federated task, the participant i gives the expected reward ER for this task.

4) The step of evaluating the contribution of the participant based on three dimensions includes:
    analyzing the contribution of the participant objectively and comprehensively through the three dimensions of the data contribution, the model evaluation, and the waiting-time allowance. A data volume and EMD (Earth Mover's Distance) is utilized to determine the contribution of data dimensions. During each round of the training, all participants submit the local models. The participant tests the accuracy of updated models of other participants using local data, and scores based on the accuracy. The average score of one participant is the evaluation result of the model dimension in the current round. The submission time recorded by the blockchain is used as the basis for calculating the waiting time.

5) The step of uploading the data to the blockchain includes:
    uploading data from the federated learning process, including the reputation and the ER of the participant, the global model in each round, the updated local model of the participant, the three factors of the contribution and the AR, to the blockchain, utilizing tamper-resistant and traceable features of the blockchain so that the training and evaluation processes are verifiable, and ensuring that the evaluation of an equity reward mechanism is objective and effectively enforced.

Figure 2:
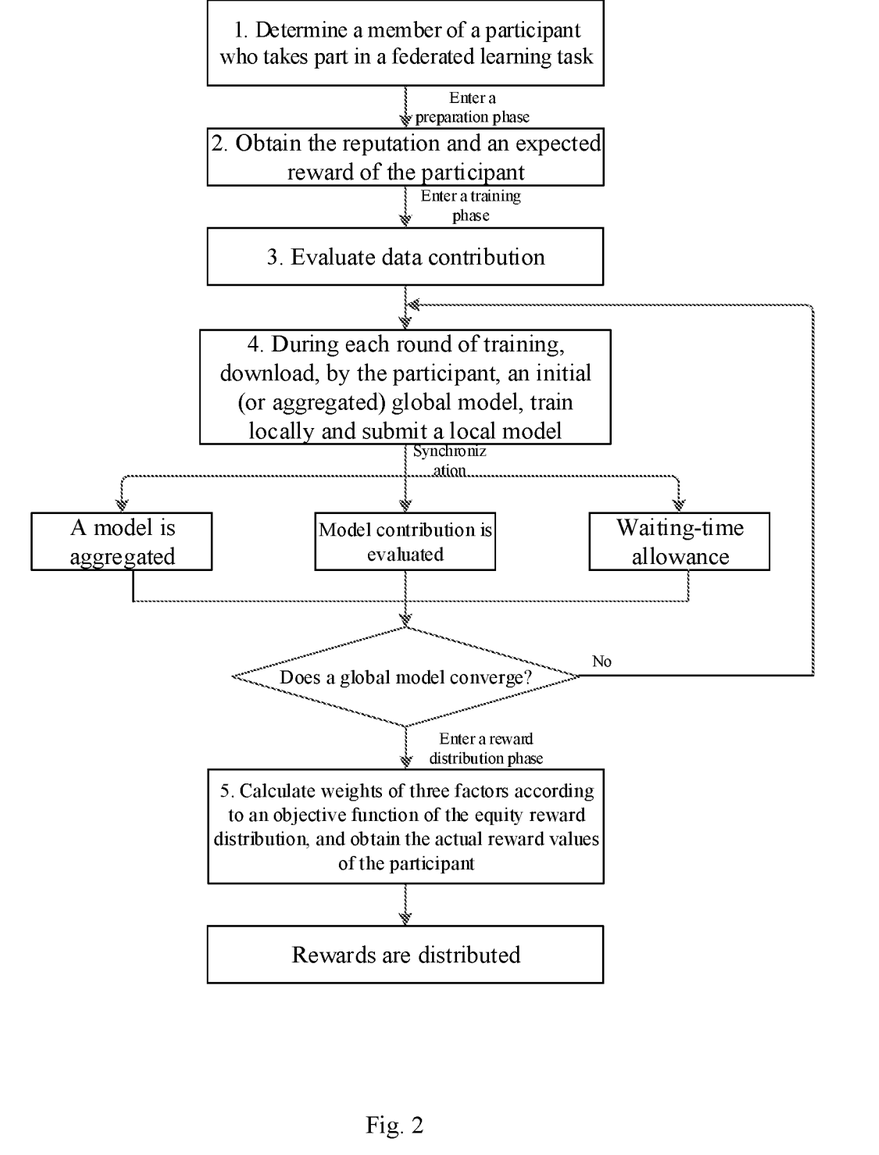
FIG. 2 is a processing flowchart of a method for distributing an equity reward for federated learning based on an equity theory provided by an embodiment of the present invention.

A processing flowchart of a method for distributing an equity reward for federated learning based on an equity theory provided by an embodiment of the present invention is shown in FIG. 2 and includes the following specific steps:

Step 1: publishing, by the task publisher, this federated learning task, for example, training a two-layer convolutional neural network using a MNIST handwritten digit recognition dataset, and describing a method for measuring the reward. A data owner selects by himself whether or not to apply for participation in the task. The task publisher determines the members of the participant.

Step 2: in the preparation phase, obtaining, by the task publisher, the reputation of the participants based on a historical reputation record. The reputation V is $$i.\ V_i = \sum_{t=t_0}^{t_{now}} \left(1 - \frac{2}{\pi} \cdot \tan^{-1}\left(\frac{A_i^t - E_i^t}{A_i^t}\right)\right) \cdot e^{-(t-t_{now})}. \quad (7.)$$

where $A_i^t$ and $E_i^t$ are the actual reward value AR and ER of the participant i in the t-th task. $e^{-(t-t_{now})}$ is the forgetting factor of the t-th task. After considering comprehensively all the factors invested in the federated task, the participant i gives the ER of this task, i.e. $E_1$.

Step 3: in the training phase, calculating, by the participant i, the data contribution $u_{1i}$ according to a formula $$u_{1i} = \frac{D_i}{D} + (1 - d_i),$$

where D is the data volume for the participant i. D is the data volume for all the participants. $d_i$ is EMD (Earth Mover's Distance) of a similarity measure between the participant i and overall data distribution; participant i uploads the data contribution $u_{1i}$ to the blockchain.

Step 4: during each round of the training, first downloading, by the participant, the initial or aggregated global model, and training the model with the local data to obtain a local model of the current round, the model contribution evaluation being a mutual scoring among the participants, and using, by the participant, the local data to evaluate the scores of the local models submitted by other participants;

uploading, by the participant i, the local model and a model evaluation score for other participants to the blockchain. The model evaluation score of the participant i in the r-th round that the task publisher obtains is $$u_{2i}^r = \frac{1}{N-1} \sum_{j \in N, j \neq i} S_{ji}^r,$$

where, $S_{ij}^r$ is the score of participant i by the participant j in the r-th round.

The blockchain records the upload time of the local model of each participant. The waiting time of participant i is subsidized as $$u_{3i}^r = \frac{T_* - T_i^r}{T_*},$$

where, $T_*$ is a waiting time threshold. The waiting time within the threshold obtains the reward.

The task publisher aggregates the local model of each participant and determines whether the global model converges according to set decision conditions. If the global model does not converge, each participant downloads the current global model and continues the forgoing training process. Step 4 is repeated until the global model converges. The convergence condition is that the global model accuracy meets a threshold requirement. The threshold is set by the task publisher.

Step 5: if it is determined that the global model converges entering the reward distribution phase, calculating, by the task publisher, the total value $u_{2i} = \Sigma_r u_{2i}^r$ of the model evaluation and the total value $u_{3i} = \Sigma_r u_{3i}^r$ of the waiting-time allowance of the participant i. Then, the three factors of the data contribution, the model evaluation, and the waiting-time allowance of participant i are evaluated as $U_i = [u_{1i}, u_{2i}, u_{3i}]^T$. Let the weights of the three factors of the data contribution, the model evaluation, and the waiting time allowance be $\Gamma = [\gamma_1, \gamma_2, \gamma_3]$. According to the objective function of the equity reward distribution, $$\min \sum_{i=1}^{N} V_i \cdot (\Gamma \cdot U_i - E_i) \quad (8.)$$

a trust domain linear constraint minimized method is utilized to calculate the weights $\Gamma$. The actual reward value $A_i = \Gamma \cdot U_i$ of the participant i can be obtained, and then the actual reward values $A_i$ are distributed to the participant i.

It should be noted that the method is not limited to the task publisher to aggregate the model and compute the reward. Further, a representative of the participant can be randomly selected to compute the process. As the data involved in the process needs to be uploaded to the blockchain, and each step can be queried and verified, the whole process of the training and the distribution of the reward is under the supervision of the entire participant. Any member of the participant can be selected to aggregate and compute the process.

In summary, the embodiments of the present invention realize the application of Adams' equity theory in the federated learning task. The contribution equity is extended to the input equity, which not only avoids the problem of poor incentive effects brought about by directly distributing the AR based on the ER, but also does not require that a participant be satisfied with the method for distributing the reward based on the contribution rate, as is the case with another equity-perceived incentive mechanism. In the present invention, the actual situation of different participants is taken into account. The actual rewards are distributed with the goal of meeting the expectations of all the participants as much as possible, to realize the equity of meeting the expectation of the participant.

In the present invention, the reputation is utilized to determine the credibility of ER given by the participant, avoiding inexperienced or malicious participants from giving unreasonable ER. The three factors, namely, the data contribution, the model evaluation, and the waiting-time allowance, are utilized to determine the actual contribution of the participant, and obtain the AR of the participant by dynamically distributing the weights of the three factors, to achieve the goal that the AR is as close as possible to the ER. Utilizing the contribution evaluation of the three factors improves the motivation of the participant during the training process while effectively countering the free-riding attack. In the present invention, a theoretical basis and a practical method for realizing the reward equity in the federated learning task are provided, which can promote the stable and sustainable development of a federated learning ecosystem.

It will be understood by the person skilled in the art that the accompanying drawings are merely the schematic diagram of one embodiment, and that a module or a process in the accompanying drawings is not necessary to carry out the present invention.

As can be seen from the foregoing description of the embodiments, it is clear to the person skilled in the art that the present invention can be realized with the aid of software plus a necessary common hardware platform. Based on this understanding, the technical solution of the present invention, in essence, or as a contribution to the prior art, can be embodied in the form of a software product. The software product of the computer may be stored in a storage medium, such as a ROM/RAM, a disk, a CD-ROM, or the like, and includes a number of instructions to cause one computer device (which can be a personal computer, a server, or a network device, or the like) to carry out the method described in the various embodiments, or in some portions of embodiments, of the present invention.

The various embodiments in this specification are described in a progressive manner. The same or similar parts between the various embodiments can be referred to as each other. Each embodiment focuses on the difference from other embodiments. In particular, since a device or system embodiment is basically similar to a method embodiment, the description is relatively simple. For related parts, please refer to the part of the description of the method embodiment. The device and system embodiments described above are merely schematic. In addition, a unit described as a separate component can or can not be physically separated. The component displayed as the unit can or can not be a physical unit, that is, the unit or the component can be located in one place, or can be distributed on a plurality of network units. Part or all of the modules can be selected according to actual needs to achieve the objective of the solution of the embodiment. It can be understood and implemented by the person skilled in the art without creative labor.

The present invention is suitable for Artificial Intelligence (AI)-related applications, including intelligent transportation, healthcare, edge computing, and robot systems, in particular, to a federated learning method. The method can be integrated as a circuit/software application for clients of federated learning, and enables enhancing clients' motivation through equity reward distribution to optimize training tasks and increase efficiency.

The foregoing is only preferable specific embodiments of the present invention, but the protection scope of the present invention is not limited thereto. The person skilled in the art can easily think of changes or substitutions within the technical scope disclosed by the present invention, which should be covered within the protection scope of the present invention. Therefore, the scope of protection of the present invention should be based on the scope of protection of the claims.

What is claimed is:

1. A method for distributing an equity reward for federated learning based on an equity theory, wherein Adams' equity theory is applied to the federated learning that is a decentralized machine learning scheme to facilitate collaborative training across participants by a coordinator thereby improving model performance of the participants, the participants are intelligent clients ranging from resource-rich devices including a large-scale server to resource-constrained device, and the coordinator served by a blockchain, and inputs and benefits of Adams' equity theory are transformed into an expected reward and an actual reward in the federated learning, comprising the following steps:

giving, by a participant, the expected reward for this task after comprehensively analyzing all factors invested in the federated task, and calculating, by a task publisher, the reputation of the participant using a historical task of the participant, wherein the participant is an intelligent client, the task publisher is a blockchain smart contract;

participating, by the participant, in each round of a training task using local data, evaluating, by the task publisher, three factors of data contribution, model contribution, and waiting-time allowance of the participant, and evaluating, by the task publisher, the contribution of the participant by combining contribution results of the three factors;

entering, by the task publisher, a reward distribution phase after a global model converges, dynamically adjusting weights of the three factors according to an objective function of the equity reward, with a goal that the actual reward of the participant is as close as possible to the expected reward, and obtaining and distributing, by the task publisher, the actual reward of the participant, the steps of giving, by the participant, the expected reward for this task after comprehensively analyzing, by the participant, all the factors invested in the federated task, and calculating, by the task publisher, the reputation of the participant using the historical task of the participant comprise:

in the preparation phase, giving, by participant i, the expected reward ER for this task after comprehensively analyzing all the factors invested in the federated task ($E_i$);

the task publisher combines a historical federated learning task of each participant and evaluates a degree of match between ER and AR for historical tasks, the task publisher utilizes a forgetting factor as a coefficient, the closer the task to a current moment, the higher the weight of the task, and the task publisher obtains the reputation $V_i$ of the participant i based on a historical reputation record of the participant with the following calculation formula:

$$V_i = \sum_{t=t_0}^{t_{now}} \left(1 - \frac{2}{\pi} \cdot \tan^{-1}\left(\frac{A_i^t - E_i^t}{A_i^t}\right)\right) \cdot e^{-(t-t_{now})} \quad (7)$$

wherein $A_i^t$ and $E_i^t$ are the actual rewards ARs and the expected rewards ERs of the participant i in a t-th task, and $e^{-(t-t_{now})}$ is a forgetting factor of the t-th task, the steps of participating, by the participant, in each round of the training task using the local data, evaluating, by the task publisher, the three factors of the data contribution, the model contribution, and the waiting-time allowance of the participant, and evaluating the contribution of the participant by combining the contribution results of the three factors comprises:

in a training process, participating, by the participant, in each round of the training task according to training rules of federated learning, and in an r-th round, downloading an aggregated global model of the r−1-th round from a blockchain, training the aggregated global model using the local data, uploading an updated local model to the blockchain, and repeating this training process, after the global model of the r-th round is aggregated, until the model converges;

in a contribution evaluation process, taking the data contribution, the model contribution, and the waiting-time allowance as the three factors, and calculating, by the participant i, the data contribution $u_{1i}$ according to a formula $$u_{1i} = \frac{D_i}{D} + (1 - d_i),$$

$D_i$ being data volume for the participant i, D being data volume for all the participants, and $d_i$ being EMD of a similarity measure between the participant i and overall data distribution;

in each round of training, determining, by the participant, an accuracy rate of the local model submitted by another participant with the local data to give an evaluation score, and an average score of the model is a model score of the round, and a score of model evaluation, calculated by the task publisher, of the participant i in the r-th round being $$u_{2i}^r = \frac{1}{N-1} \sum_{j \in N, j \neq i} S_{ji}^r,$$

wherein $S_{ji}^r$ being a participant j-to-participant i score in the r-th round;

obtaining, by the task publisher, the waiting time of the participant using the upload time of the local model recorded by the blockchain, then the waiting-time allowance of the participant i in the r-th round being $$u_{3i}^r = \frac{T_* - T_i^r}{T_*},$$

being a waiting-time threshold, and obtaining the reward at waiting time within the threshold;

evaluating, by the task publisher, the contribution of participant i by combining the contribution results of the participant i of the three factors; and improving decision-making and task execution efficiency of intelligent devices by integrating the method for distributing the equity reward for federated learning.

2. The method according to claim 1, wherein the steps of entering the reward distribution phase when the global model converges, dynamically adjusting the weights of the three factors, by the task publisher, according to the objective function of the equity reward, with the goal that the actual reward of the participant is as close as possible to the expected reward, and obtaining and distributing, by the task publisher, the actual reward of the participant comprises:

aggregating, by the task publisher, the local model of each participant and determining, by the task publisher, whether the global model converges according to set decision conditions, if the global model does not converge, downloading, by each participant, a current global model and continuing the forgoing training process;

if it is determined that the global model converges, the reward distribution phase is entered, if the task publisher calculates a total value $u_{2i} = \Sigma_r i_{2i}^r$ of the model evaluation and a total value $u_{3i} = \Sigma_r u_{3i}$ of the waiting-time allowance of the participant i, the evaluation results of the three factors of the data contribution, the model evaluation and the waiting-time allowance of the participant i are $U_i = [u_{1i}, u_{2i}, u_{3i}]^T$, let the weights of the three factors of the data contribution, the model evaluation and the waiting-time allowance be $\Gamma = [\gamma_1, \gamma_2, \gamma_3]$, the weights F are calculated by using a trust domain linear constraint minimized method according to an objective function of an equity reward distribution to obtain actual reward value $A_i = \Gamma \cdot U_i$ of the participant i, the actual reward value $A_i$ is distributed to the participant i, and the objective function of the equity reward distribution is as follows:

$$\min \sum_{i=1}^{N} V_i \cdot (\Gamma \cdot U_i - E_i) \tag{8}$$

wherein expectations of all participants are met.

3. The method according to claim 1, wherein the method further comprises: uploading data from a federated learning process to the blockchain, the data comprising the reputation and an ER of the participant, the global model of each round, the updated local model of the participant, the three factors of contribution and the AR.

* * * * *